(12) United States Patent
Rothschild et al.

(10) Patent No.: US 8,983,275 B2
(45) Date of Patent: Mar. 17, 2015

(54) SYSTEMS, METHODS, AND APPARATUS FOR RECORDING TIME DELAYED BROADBAND CONTENT

(75) Inventors: Keith Alan Rothschild, Dunwoody, GA (US); Benjamin Adam Perry, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 231 days.

(21) Appl. No.: 13/033,339

(22) Filed: Feb. 23, 2011

(65) Prior Publication Data

US 2012/0213496 A1 Aug. 23, 2012

(51) Int. Cl.
*H04N 5/92* (2006.01)
*H04L 29/06* (2006.01)
*H04N 21/24* (2011.01)
*H04N 21/262* (2011.01)
*H04N 21/433* (2011.01)

(52) U.S. Cl.
CPC ........ *H04L 65/1083* (2013.01); *H04N 21/2402* (2013.01); *H04N 21/2625* (2013.01); *H04N 21/4334* (2013.01)
USPC ................. 386/326; 375/240.01; 375/E7.026

(58) Field of Classification Search
CPC ............................ H04N 1/32053; H04N 5/76
USPC ...................... 386/326; 375/E07.026, 240.01
See application file for complete search history.

(56) References Cited

U.S. PATENT DOCUMENTS

| | | | |
|---|---|---|---|
| 2006/0064721 A1* | 3/2006 | Del Val et al. | 725/41 |
| 2007/0230466 A1* | 10/2007 | Muguruma | 370/390 |
| 2008/0152020 A1* | 6/2008 | Kayashima et al. | 375/240.28 |
| 2009/0046987 A1* | 2/2009 | White et al. | 386/83 |
| 2010/0260474 A1* | 10/2010 | Sakurai | 386/83 |

* cited by examiner

*Primary Examiner* — Thai Tran
*Assistant Examiner* — Girumsew Wendmagegn
(74) *Attorney, Agent, or Firm* — Sutherland Asbill & Brennan LLP

(57) ABSTRACT

Systems, methods, and apparatus for recording time delayed broadband content are provided. Desired content to be recorded may be identified by a programming processing component configured to receive broadband content output by a service provider. A channel associated with the desired content and an amount of delay associated with the channel may be determined. Based at least in part upon the determined amount of delay, the recording of the desired content may be scheduled by the programming processing component.

16 Claims, 3 Drawing Sheets

SYSTEMS, METHODS, AND APPARATUS FOR RECORDING TIME DELAYED BROADBAND CONTENT

FIELD OF THE INVENTION

Aspects of the invention relate generally to recording broadband content, and more particularly, to recording broadband content including delays introduced by a service provider.

BACKGROUND OF THE INVENTION

A wide variety of service providers, such as cable providers and satellite providers, provide broadband communications services, such as television services, to customers. Typically, a service provider receives content from various content providers, such as television networks, and the service provider encodes or otherwise processes the content. For example, the service provider typically compresses the content and adds the compressed content to a broadband signal that is output to customers.

Encoding efficiency generally involves a trade-off between content quality and an amount of delay introduced into the signal carrying the content. For certain content, such as content that is not transmitted as a live event, it may be desirable to improve the signal quality of the content at the expense of adding a time delay to the content. However, with the use of digital video recording ("DVR") devices by customers, timing overlaps and conflicts may exist between various content that customers desire to record. For example, if a delay is added to first desired content but not to second desired content, then a timing overlap may exist between the two items of desired content. Accordingly, improved systems, methods, and apparatus for facilitating the recording of time delayed broadband content are desirable.

BRIEF DESCRIPTION OF THE INVENTION

Some or all of the above needs and/or problems may be addressed by certain embodiments of the invention. Embodiments of the invention may include systems, methods, and apparatus for recording time delayed broadband content. In one embodiment, a programming processing component that facilitates recording of broadband content may be provided. The programming processing content may include at least one communications interface and at least one processor. The at least one communications interface may be configured to receive broadband content output by a service provider. The at least one user interface may be configured to (i) identify desired content to be recorded, the desired content comprising content included in the received broadband content, (ii) determine a channel associated with the desired content, (iii) determine an amount of delay associated with the channel, and (iv) schedule, based at least in part upon the determined amount of delay, the recording of the desired content.

In accordance with another embodiment of the invention, a method for recording time delayed broadband content may be provided. Desired content to be recorded may be identified by a programming processing component configured to receive broadband content output by a service provider. A channel associated with the desired content and an amount of delay associated with the channel may be determined. Based at least in part upon the determined amount of delay, the recording of the desired content may be scheduled by the programming processing component.

In accordance with yet another embodiment of the invention, a system that facilitates the time delay of broadband content may be provided. The system may include at least one encoder device, at least one guide data server, and at least one communications interface. The at least one encoder device may be configured to (i) encode at least a portion of a broadband communications signal, wherein a delay is introduced into the encoded content in order to improve the quality of the encoded content, and (ii) insert information associated with the introduced delay into the encoded content. The at least one guide data server may be configured to (i) determine, based at least in part upon the inserted information, an amount of delay associated with the encoded content and (ii) incorporate information associated with the determined amount of delay into electronic program guide data. The at least one communications interface may be configured to output the broadband communications signal and the electronic program guide data for communication to a programming processing component via a broadband network. Based upon the output of the electronic program guide data and/or broadband communications signal, a programming processing component may be configured to utilize the information associated with the determined amount of delay to schedule a recording of at least a portion of the encoded content.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
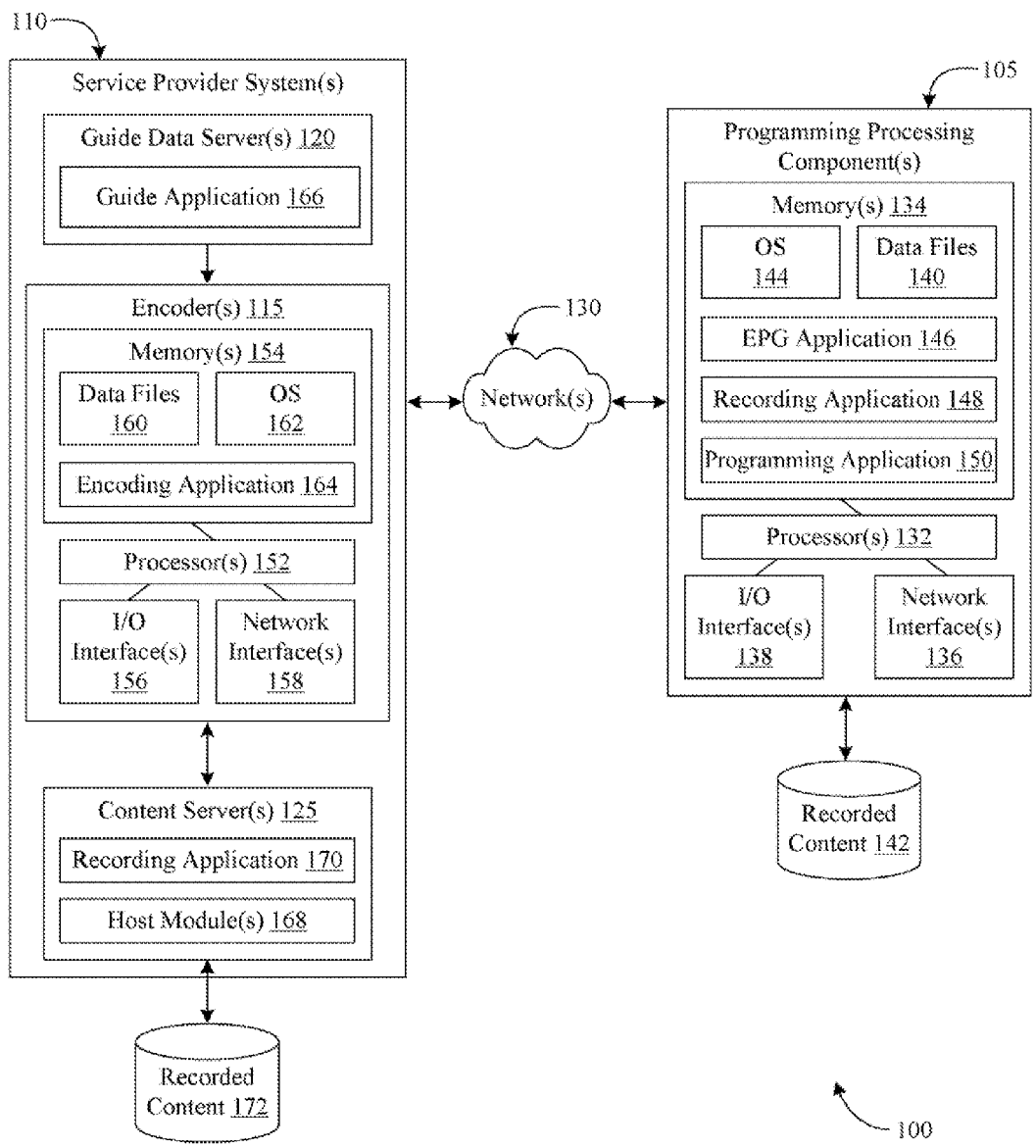
FIG. 1 illustrates a block diagram of an example system that may be utilized to facilitate recording of time delayed broadband content, according to an illustrative embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and apparatus for facilitating recording of time delayed broadband content. In certain embodiments, a service provider may be configured to output a broadband communications signal for receipt by one or more programming processing components (e.g., set-top boxes, etc.) associated with customers of the service provider. Various components of the broadband communications signal may be encoded by one or more encoders or encoder devices associated with the service provider. For example, a suitable codec device may encode various digital data streams (e.g., data streams associated with television programs, data streams associated with movies, etc.) that form components of the broadband communications signal. In accordance with an aspect of the invention, a time delay may be added to one or more data streams, content, or components of the broadband communications signal. In this regard, a relatively higher quality signal or data stream may be produced and/or output by the encoder. In other words, signal quality may be improved by adding static delays to certain content included in the broadband communications signal. In the event that an encoder adds a time delay to a data stream or other content, the encoder may generate information associated with an amount of delay that has been introduced. As desired, the encoder may include at least a portion of the generated information in the encoded data. For example, a marker or identifier that indicates an amount of delay may be inserted into the encoded data. Additionally or alternatively, the encoder may provide at least a portion of the generated information to other components of the service provider, such as a guide server.

In various embodiments of the invention, at least one guide server may be associated with the service provider. A guide server may generate electronic program guide information that may be communicated to customers of the service provider. The guide information may be utilized, for example, by a programming processing component of the customer to generate an electronic program guide that maps television schedule information to times and channels. In certain embodiments, the guide server may include delay information in the guide information that is output for communication to customers. For example, delay information may be determined for a plurality of channels, and the delay information may be output in conjunction with electronic program guide information. A guide server may utilize a wide variety of suitable methods to determine delay information for a channel. As one example, the guide server may identify delay information inserted into encoded data by an encoder device. As another example, delay information may be communicated to the guide server by one or more encoder devices. The guide server may utilize the delay information to determine delays associated with various programming channels, and the delay information may be added to guide information.

Additionally, in certain embodiments, the guide server may identify or determine latency or network delays associated with the communication of signals between the service provider and various customer devices. For example, the guide server may utilize network topology information to calculate network delay information. As desired, the network delay information may be added to delay information associated with encoding content, and a total delay for various content may be determined. Information associated with the total delay may then be inserted or incorporated into electronic guide data.

Following the output of a broadband communications signal, the broadband communications signal may be received by at least one programming processing component associated with a customer of the service provider. The programming processing component may process at least a portion of the received signal and output various components of the signal for presentation to a customer. According to an aspect of the invention, the programming processing component may additionally facilitate scheduling the recording of various content received in the broadband communications signal. For example, the programming processing component may process one or more user requests to schedule recordings. According to an aspect of the invention, the programming processing component may utilize delay information in the scheduling of recordings. As one example, the programming processing component may identify a channel associated with desired content to be recorded. The programming processing component may then determine or identify a delay associated with the channel. For example, electronic program guide information associated with the channel may be analyzed to determine an amount of delay associated with the desired content. The programming processing component may then schedule the recording based at least in part on the determined amount of delay.

Additionally, in certain embodiments, the programming processing component may identify and resolve conflicts between multiple recordings. For example, the programming processing component may identify a first amount of delay associated with first desired content antha second amount of delay associated with second desired content. The programming processing component may then determine whether there is a timing overlap between the first desired content and the second desired content. For example, a situation might exist in which the first desired content has a first delay that is greater than a second delay associated with the second desired content so that recording the first desired content will overlap with recording the second desired content. In the event that a timing overlap is identified, the programming processing component may take a wide variety of control actions to resolve the conflict. For example, the programming processing component may cut off a portion of overlapping content (e.g., a portion of the first desired content, a portion of the second desired content, portions of the first desired content and the second desired content, etc.) during the recording. In the event that a portion of the overlapping content is cut off, the cut off portion may be obtained by the programming processing component from any number of other sources. For example, in certain embodiments, the service provider may include overlapping portions of content in other components of the broadband signal (e.g., as a carrier signal, etc.), and the programming processing component may identify and record the relevant cut off portion. As another example, the programming processing component may download a cut off portion from one or more servers associated with the service provider.

System Overview

An example system 100 for facilitating the recording of time delayed broadband content will now be described illustratively with respect to FIG. 1. The system 100 may include, for example, one or more programming processing components 105 and/or one or more service provider systems 110. The service provider systems 110 may include any number of components, such as one or more encoders 115, one or more guide data servers 120, and/or one or more content servers 125 or content recording servers. Any number of suitable networks 130, such as broadband communications networks (e.g., cable networks, satellite networks, etc.), may facilitate communications between the service provider systems 110 and the programming processing components 105. As desired, one or more components of the system 100 may be processor-driven components or devices. Additionally, in certain embodiments, certain components of the system 100 may be combined.

Any number of programming processing components 105 may be associated with various customers of a service provider. With reference to FIG. 1, a programming processing component 105 may be a suitable device or component that facilitates the receipt, processing, and/or output of at least one broadband signal, such as a broadband cable signal or a broadband satellite signal. Additionally, the programming processing component 105 may facilitate the receipt and processing of user requests to record desired content, such as user requests to record desired content that is being broadcast or that will be broadcast at a subsequent point in time (e.g., upcoming television content, etc.). In certain embodiments, the programming processing component 105 may be a customer premise device or component that is situated within a customer's household or other structure associated with the customer. The programming processing component 105 may include suitable hardware and/or software components capable of receiving and processing a broadband signal (e.g., a cable signal, a satellite signal, etc.) output by a service provider system 110, such as a cable service provider system or a satellite service provider system. Examples of suitable programming processing components include, but are not limited to, a set-top box ("STB") (e.g., a cable STB, a digital satellite STB, an Internet Protocol Television STB, etc.), a virtual STB, an embedded STB, etc.

In certain embodiments, the programming processing component 105 may be connected to one or more display devices, such as a television, associated with a customer. In other embodiments, the programming processing component 105 may be embedded, incorporated into, and/or executed on the display device. In operation, the programming processing component 105 may receive at least a portion of a broadband data signal output by the service provider system 110, and the programming processing component 105 may convert at least a portion of the received signal into content which is displayed or otherwise output by the display device. Additionally, the programming processing component 105 may be configured to record or store at least a portion of the received broadband content. As desired, the programming processing component 105 may receive a broadband data signal via any number of suitable service provider networks 130, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the service provider system 110 and the programming processing component 105.

As desired, the broadband signal provided to the programming processing component 105 may include a wide variety of data components, including but not limited to, a television signal, a digital television signal, data associated with a VoIP telephone service, data associated with Internet service, data associated with home monitoring services, etc. The programming processing component 105 may receive and process the broadband signal. As desired, the programming processing component 105 may selectively output a portion of the broadband signal, such as digital television data (e.g., audio and/or video data), electronic program guide data, various Web pages, etc., to the display device for display. Additionally, in certain embodiments, the programming processing component 105 may selectively store received content in one or more suitable memory devices for subsequent output for presentation to a customer or user via the display device. Additionally, in certain embodiments, the programming processing component 105 may output audio data to any number of audio components, such as a home theater system, a stereo system, etc.

The programming processing component 105 may be a suitable processor-driven device that facilitates the receipt, processing, and/or output of a broadband signal. Additionally, the programming processing component 105 may be a suitable processor-driven device that facilitates the recording of desired content. As such, the programming processing component 105 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the programming processing component 105 may form a special purpose computer or other particular machine that is operable to facilitate the recording of desired content and/or the processing and output of broadband content.

With reference to FIG. 1, the programming processing component 105 may include one or more processors 132, one or more memory devices 134, one or more transceivers and/or network interfaces 136, and/or one or more input/output ("I/O") interfaces 138. The processors 132 may be configured to execute any number of software applications and/or computer-readable or computer-executable instructions. The memory devices 134 may include any number of suitable memory devices, such as caches, read-only memory devices, random access memory devices, flash memory devices, magnetic storage devices, removable storage devices (e.g., memory cards, memory sticks, etc.), etc. The memory devices 134 may include internal memory devices and/or external memory devices in communication with the programming processing component 105. The memory devices 134 may store data, executable instructions, and/or various program modules utilized by the processors 132. Examples of data that may be stored by the memory devices 134 include data files 140, recorded content 142, and/or any number of suitable program modules that may be executed by the processors 132, such as an operating system ("OS") 144, an electronic program guide ("EPG") application 146, a recording application 148, and/or a programming application 150.

The data files 140 may include any suitable data that facilitates the operation of the programming processing component 105, the processing of a received broadband signal, the receipt of recording requests, the processing of recording requests, and/or the recording of desired content. For example, the data files 140 may include, but are not limited to, user profile information, information associated with requests to record desired content, delay information for one or more scheduled recordings, conflict or overlap information associated with scheduled recordings, information associated with any number of content servers 125, information associated with desired content recorded by the content servers 125 (e.g., cut off portions of content), and/or information associated with retrieving desired content from the content servers 125. The recorded content 142 may include desired content that has been recorded by the programming processing component 105 and/or desired content that has been recorded by the content servers 125 and downloaded to the programming processing component 105. For example, the recorded content 142 may include video and/or audio content recorded by the programming processing component 105 or a local recording device (e.g., a digital video recording device, a second programming processing component 105, etc.) in communication with the programming processing component 105. As another example, the recorded content 142 may include cut off portions of desired content that have been recorded by the content servers 125 and communicated from the content servers 125 to the programming processing component 105. As desired, the recorded content 142 may be stored in one or more internal memory devices (e.g., internal hard drives, internal flash drives, etc.) of the programming processing component 105 and/or in one or more external memory devices accessible by the programming processing component 105.

The OS 144 may be a suitable software module that controls the general operation of the programming processing component 105. The OS 144 may also facilitate the execution of other software modules, for example, the EPG application 146, the recording application 148, and/or the programming application 150. The EPG application 146 may be a suitable software module that facilitates the processing of program guide information received by the programming processing component 105. For example, electronic program guide ("EPG") information may be included in a broadband signal received by the programming processing component 105. The EPG application 146 may format at least a portion of the received EPG data for presentation to a customer via an EPG grid. For example, received EPG data may be parsed and organized by channel and time slot. The organized data may then be formatted for display in an interactive program guide grid. For example, based upon the receipt of a user command or request for EPG data, such as a selection of a remote control button or option associated with requesting guide data, the EPG application 146 may direct the output of the interactive program guide grid for presentation to the customer via the display device.

Once presented, a user may navigate through a displayed program guide grid in order to view scheduled content, such as current and upcoming television content. For example, the user may utilize a remote control to navigate through the grid. As desired, the user may utilize the grid to request the recording of one or more items of desired content. For example, the user may select individual entries included in the grid, and the user may request that the content associated with the grid entry be recorded. A recording request made by the user may be received by the EPG application 146 and provided to the recording application 148. Additionally, the EPG application 146 may analyze the EPG information for desired content in order to identify an amount of delay associated with the desired content. For example, the EPG application 146 may evaluate the EPG information for a channel associated with desired content, and the EPG application 146 may identify a marker and/or delay information included in the EPG information. The EPG application 146 may then determine an amount of delay associated with the channel and the desired content. Information associated with the amount of delay may be communicated by the EPG application 146 to the recording application 148.

The recording application 148 may be a suitable software module that facilitates the scheduling of and recording of desired content. In operation, the recording application 148 may receive user commands or requests to record desired content and delay information associated with various desired content. In certain embodiments, a user command to record desired content may be received via a user's interaction with an EPG grid. In other embodiments, a user command to record desired content may be received via one or more suitable network communications. For example, a user may utilize a suitable user device (e.g., a personal computer, a mobile device, etc.) to access a Web-based application hosted by the service provider system 110, and the user may request, via the Web-based application, that desired content be recorded. The service provider system 110 may then communicate the recording request to the programming processing component 105 via one or more suitable networks 130. As yet another example, a user may utilize a user device to directly access an application hosted by the programming processing component 105 (e.g., the recording application), and a user command to record desired content may be communicated to the programming processing component 105. For example, a wireless communications session (e.g., a Bluetooth communications session, a Wi-Fi communications session, etc.) may be established between a user device and the programming processing component 105, and a recording request may be received via the established communications session.

Once a user command to record desired content has been received, the recording application 148 may schedule the recording of the desired content. According to an aspect of the invention, the recording application 148 may utilize delay information associated with the desired content, such as delay information received from the EPG application 146, to schedule recordings for the desired content. For example, the recording application 148 may utilize delay information in order to determine recording times (e.g., a start time, a stop time, etc.) for recording desired content. The recording application 148 may then schedule and facilitate the recording of the desired content.

According to an aspect of the invention, the recording application 148 may additionally resolve timing conflicts between desired content that is recorded. For example, the recording application 148 may identify timing overlaps resulting from differing amounts of delay for two different items of desired content, and a conflict between the two items of desired content may be identified. The recording application 148 may resolve the identified conflict by determining a portion of at least one of the items of desired content to cut off, and the cut off portion may not be recorded. For example, if the delay for a first item of desired content causes the end of the content to extend into the start of a second item of desired content, the recording application 148 may cut off a portion of the first desired content and/or a portion of the second desired content. As one example, the end of the first desired content may be cut off. As another example, the start of the second desired content may be cut off. As yet another example, both a portion of the first desired content and a portion of the second desired content may be cut off. In this regard, the recording application 148 may resolve timing conflicts during the recording of time delayed content.

As desired, a wide variety of parameters and/or factors may be evaluated during the determination of a portion of content to be cut off. Examples of parameters that may be evaluated include, but are not limited to, the types of content (e.g., movies, television shows, live content, etc.), user preferences, user viewing history, and/or the availability or likelihood of obtaining the cut off portion from another source (e.g., a content server 125, another portion of the broadband communications signal, etc.). For example, a determination may be made to cut off the end of a movie because it is unlikely that a customer will be interested in viewing the credits. As another example, a determination may be made to cut off a portion of the desired content that a user is least likely to watch. As yet another example, a determination may be made to cut off a portion of the desired content that is available for download from a content server 125.

In certain embodiments, the recording application 148 may obtain a cut off portion of content from any number of other sources. As one example, the recording application 148 may identify another component of the broadband communications signal that includes the cut off portion, and the recording application 148 may obtain the cut off portion from the other component of the signal. For example, a component of the service provider system 110 may identify overlapping portions of various channels that result from varying amounts of delays, and at least a portion of the overlapping information (e.g., a portion of data for a first channel that overlaps with a second channel) may be inserted into an available bandwidth within the broadband communications signal. Overlap information may be included, for example, as a carrier or secondary signal within another channel or in a channel designated for overlap information. As desired, the service provider system 110 may insert location identifiers, pointers, and/or markers into various channels that facilitate the programming processing component 105 identifying a location of overlap information in order to record cut off portions.

As another example of obtaining a cut off portion, the recording application 148 may download a cut off portion and/or overlap information from a content server 125 or other suitable device or system associated with the service provider system 110. For example, the recording application 148 may download a cut off portion during a background download process. As desired, the recording application 148 may communicate reservation requests to the content server 125 to facilitate recording of a cut off portion. For example, the recording application 148 may identify a timing overlap and make a cut off determination. The recording application 148 may then communicate a request to the content server 125 to record the cut off portion. A wide variety of information may be included in a request, such as an identifier of the programming processing component 105, an identifier of the cut off portion, an identifier of the user, and/or a recording time. As an alternative to the recording application 148 requesting the recording of cut off portions, the content server 125 may identify overlap portions and record the overlap portions for subsequent delivery to various programming processing components 105. As mentioned above, a wide variety of parameters may be evaluated by the recording application 148 to determine the portion(s) of desired content that is cut off. For example, the recording application 148 may identify content that is recorded by and/or is available from a content server 125, and the recording application 148 may determine a cut off portion based at least in part upon the identification.

Following the communication of a request to the content server 125, the recording application 148 may receive one or more responses to the request. For example, the recording application 148 may receive an indication that the request has been received and/or an indication of whether a network recording of the desired cut off portion has been authorized to be performed. In the event that a network recording has been authorized by the content server 125, a unique identifier associated with the recorded cut off portion may be communicated to the recording application 148 by the content server 125. The unique identifier may include information that facilitates subsequent retrieval of the recorded cut off portion by the recording application 148, such as information identifying a block of memory at which the recorded cut off portion is stored and/or access credentials for downloading the recorded cut off portion. The unique identifier may be communicated by the content server 125 either before the recording has been completed or after the recording has been completed. As desired, the recording application 148 may utilize the unique identifier and/or any required access credentials to generate a request to download the recorded content from the content server 125. Based upon the generated request, the cut off portion may be communicated from the content server 125 to the programming processing component 105 via one or more suitable networks 130, and the cut off portion may be stored locally in one or more memory devices associated with the programming processing component 105.

A wide variety of suitable methods and/or techniques may be utilized as desired by the recording application 148 to download content (e.g., cut off portions) from the content server 125. As one example, a passive downloading process may be utilized by the recording application 148 to request a download of content. In this regard, content may be downloaded to the programming processing component 105 in a background process that is transparent to the user. As desired, a wide variety of download parameters may be evaluated by the recording application 148 in order to determine when to download the desired content. Examples of suitable download parameters that may be evaluated include, but are not limited to, a time of day, an available bandwidth for downloading content, a type of download to be performed (e.g., video on demand session, narrowcast, unicast, etc.), an availability of local resources associated with the programming processing component 105, and/or a determination of when the recorded content will likely be viewed by the user. As desired in various embodiments, a wide variety of different types of download sessions may be utilized to download content to one or more programming processing components 105. Examples of suitable types of download sessions include background sessions (e.g., trickle download sessions, etc.), real-time download sessions, and/or faster than real-time download sessions. As a result of evaluating the download parameters, the recording application 148 may determine an appropriate time to download the content. For example, the content may be downloaded at a time when sufficient network bandwidth is available, such as late at night or while a user is likely at work or at school. As another example, if it is determined that a user will likely request viewing of the content before a certain time, attempts may be made to download the content prior to reaching the time at which the content will likely be requested. As another example of downloading content, the recording application 148 may request a download of a cut off portion based upon the receipt of a user command or request to download and/or view recorded content.

A wide variety of suitable operations may be performed by the recording application 148 to facilitate the recording of desired content. The operations described above are provided by way of example only. Another example of the operations that may be performed by the recording application 148 is described in greater detail below with reference to FIGS. 2 and 3.

With continued reference to FIG. 1, the programming application 150 may be a suitable software module that facilitates the processing and/or output of received broadband content and/or stored broadband content. For example, the programming application 150 may be configured to format at least a portion of a received broadband signal and/or at least a portion of the stored content for output by the programming processing component 105 and presentation via one or more display devices. A wide variety of content may be formatted for output by the programming application 150 as desired in various embodiments of the invention including, but not limited to, television content, audio content, VoIP telephone content, electronic program guide data, Internet and/or Web site content, etc. Additionally, the programming application 150 may be configured to receive and process user commands associated with the output of content. For example, the programming application 150 may be configured to process user commands received via remote control input and/or user voice commands.

With continued reference to the programming processing component 105, the one or more I/O interfaces 138 may facilitate communication between the programming processing component 105 and one or more input/output devices, for example, one or more user interface devices, such as a remote control, display, keypad, mouse, pointing device, control panel, touch screen display, microphone, speaker, etc., that facilitate user interaction with the programming processing component 105. In this regard, user commands may be received by the programming processing component 105. The one or more network interfaces 136 may facilitate connection of the programming processing component 105 to one or more suitable networks 130, such as service provider networks or broadband networks (e.g., a cable network or a satellite network) and/or local area networks (e.g., a Bluetooth-enabled network, a Wi-Fi enabled network, etc.). In this regard, the programming processing component 105 may receive a broadband signal for processing and output. Additionally, the programming processing component 105 may communicate commands and/or requests to the service provider system 110, and the programming processing component 105 may receive commands and/or information from the service provider system 110.

With continued reference to FIG. 1, the service provider system 110 may include any number of systems and/or devices that facilitate the output of a broadband signal for receipt by any number of programming processing components. For example, the service provider system 110 may include systems associated with a cable service provider, a satellite service provider, or other service provider. In operation, the service provider system 110 may receive content from one or more content providers, format content for output in a broadband signal, and/or output the broadband signal. As shown, one or more encoders 115, one or more guide data servers 120, and/or one or more content servers 125 may be associated with the service provider system 110. Examples of other suitable devices and/or systems that may be associated with the service provider system 110 include, but are not limited to, a service provider head-end component, a conditional access system controller, any number of encryption devices, an on-demand server, a pay-per-view purchase server, etc.

According to an aspect of the invention, the service provider system 110 may include or be associated with one or more encoders 115 or encoder devices that facilitate preprocessing of content prior to the content being incorporated into a broadband communications signal. For example, an encoder 115 may facilitate the compression, encoding, and/or encryption of content. As desired, an encoder 115 may improve the quality of encoded content by adding a delay, such as a static delay, to the encoded content. For example, an encoder 115 may perform additional processing on the encoded content at the expense of adding a delay to the content. In this regard, relatively higher quality content may be output by the service provider for communication to the programming processing components of customers.

An encoder 115 may be a suitable processor-driven device configured to receive and process content in order to generate encoded content. Examples of suitable processor-driven devices that may be utilized as an encoder 115 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the encoder 115 may form a special purpose computer or other particular machine that is operable to facilitate the receipt of content and/or the encoding or other processing of content.

In addition to one or more processors 152, the encoder 115 may include one or more memory devices 154, one or more input/output ("I/O") interfaces 156, and/or one or more network interfaces 158. The processors 152 may be configured to execute any number of software applications and/or computer-readable or computer-executable instructions. The memory devices 154 may include any number of suitable memory devices, such as caches, read-only memory devices, random access memory devices, flash memory devices, magnetic storage devices, etc. The memory devices 154 may store data, executable instructions, and/or various program modules utilized by the processors 152. Examples of data that may be stored by the memory devices 154 include data files 160 utilized by the encoder 115. Additionally, the memory devices 154 may be configured to store any number of suitable program modules that may be executed by the processors 152, such as an operating system ("OS") 162 and/or an encoding application 164.

The data files 160 may include any suitable data that facilitates the operation of the encoder 115, the receipt of content from various content providers (e.g., television networks, etc.), and/or the encoding of content. For example, the data files 160 may include, but are not limited to, information that facilitates communication with any number of content providers, information associated with received content (e.g., information associated with types of content, etc.), parameters and/or preferences associated with the encoding of content, delay parameters, and/or information associated with various amounts of delay added to content. The OS 162 may be a suitable software module that controls the general operation of the encoder 115. The OS 162 may also facilitate the execution of other software modules by the processors 152, for example, the encoding application 164.

The encoding application 164 may be a suitable software module that facilitates the processing and encoding of content, such as content received from various content providers and/or content generated by the service provider. In operation, the encoding application 164 may receive or otherwise obtain content to be encoded. The encoding application 164 may compress, encode, and/or otherwise process content in order to generate encoded content. Following the encoding of content, the encoding application 164 may direct the addition of the encoded content to a broadband communications signal output by the service provider system 110. In this regard, the encoded content may be communicated to one or more programming processing components 105 associated with customers of the service provider.

In certain embodiments of the invention, the encoding application 164 may add a delay, such as a static delay, to encoded content. For example, the encoding application 164 may evaluate one or more encoding parameters in order to determine a type of encoding that will be performed. As one example, the encoding application 164 may identify a type associated with the content (e.g., live content, movie content, television content, etc.), and the encoding application 164 may utilize the encoding parameters to determine a type of encoding to be performed for the type of content. As another example, the encoding application 164 may determine an amount of available bandwidth for the content, and the encoding application 164 may utilize the encoding parameters to determine a type of encoding to be performed given the available bandwidth. Indeed, a wide variety of different parameters may be evaluated in order to determine a type of encoding to be performed. In certain embodiments, the encoding may add a delay to the encoded content. For example, encoding the content in order to improve the quality of the encoded content may result in a delay being added. A wide variety of different amounts of delay may be added to the content as desired in various embodiments of the invention, such as a delay of a fraction of a second, a delay of one or several seconds, a delay of a minute, etc. Once the content has been encoded, the encoding application 164 may direct the inclusion of the encoded content into a broadband communications signal that is output by the service provider system 110.

In the event that a delay is added to the encoded content, the encoding application 164 may generate information associated with the delay, such as information identifying an amount of delay that has been added to the content. In certain embodiments, the delay information may be embedded in the encoded content in order to allow other devices and/or systems to identify an amount of delay associated with the encoded content. For example, one or more markers including delay information may be added to the encoded content. In other embodiments, the delay information may be communicated by the encoding application 164 to other components of the system 100, such as the guide data servers 120.

A wide variety of suitable operations may be performed by the encoding application 164 as desired in various embodiments of the invention. The operations described above are provided by way of example only. Another example of the operations that may be performed by the encoding application 164 is described in greater detail below with reference to FIG. 2.

With continued reference to the encoder 115, the one or more I/O interfaces 156 may facilitate communication between the encoder 115 and one or more input/output devices, for example, one or more user interface devices, such as a display, keypad, mouse, pointing device, control panel, touch screen display, remote control, microphone, speaker, etc., that facilitate user interaction with the encoder 115. In this regard, user commands may be received by the encoder 115. The one or more network interfaces 158 may facilitate connection of the encoder 115 to one or more suitable networks 130, for example, a broadband network or a service provider network (e.g., a cable network, a satellite network, etc.) that facilitates communication with programming processing components 105, one or more networks that facilitate communication with other components of the service provider system 110 (e.g., a local area network, etc.), and/or one or more networks that facilitate communication with various content providers (e.g., the Internet, a wide area network, a satellite network, a dedicated communications channel, etc.).

According to an aspect of the invention, the service provider system 110 may include or be associated with any number of guide data servers 120. A guide data server 120 may be configured to generate electronic program guide data that may be output for communication to one or more programming processing components 105. The electronic program guide data may include time and channel information associated with various content included in a broadband communications signal. Additionally, in various embodiments of the invention, the guide data server 120 may be configured to include time delay information in the electronic program guide data. In this regard, the programming processing components 105 may utilize time delay information during the scheduling of recordings.

As desired, a guide data server 120 may include any number of suitable processor-driven devices configured to generate electronic program guide data and incorporate the electronic program guide data into a broadband communications signal. Examples of suitable processor-driven devices that may be associated with or utilized as a guide data server 120 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the guide data server 120 may form a special purpose computer or other particular machine that is operable to facilitate the generation of electronic program guide data and the inclusion of electronic program guide data in a broadband communications signal.

As desired, the guide data server 120 may include components that are similar to those described above for the encoder 115. For example, the guide data server 120 may include any number of processors, memory devices, I/O interfaces, and/or network interfaces. The memory devices may store data files and/or software modules utilized by the processors to facilitate the functionality of the guide data server 120. For example, a guide application 166 may be accessed from memory and executed by the processors to facilitate the generation of electronic program guide data.

The guide application 166 may be a suitable software module or application that facilitates the generation of electronic program guide data and the inclusion of the electronic program guide data in a broadband communications signal. In operation, the guide application 166 may obtain delay information for encoded content that is included in the broadband communications signal, and the guide application 166 may utilize the obtained information to determine delays. In certain embodiments, the guide application 166 may analyze or evaluate the broadband communications signal, identify markers and/or associated delay information (e.g., amount of delay information, etc.), and determine delays for various content based at least in part upon the delay information. In other embodiments, the guide application 166 may receive delay information from one or more encoders 115, and the guide application 166 may determine delays for various content based at least in part upon the received delay information. The guide application 166 may then map the determined delays to various channels (e.g., television channels) associated with the content, and the guide application 166 may incorporate information associated with the determined delays into the electronic program guide data.

In certain embodiments, the guide application 166 may additionally calculate or determine one or more latency or network topology delays associated with the content. For example, network delays associated with communication of content to various programming processing components 105 and/or groups of programming processing components may be calculated. As desired, one or more calculated latency delays may be added to static delay information to calculate or determine total delays associated with various encoded content. The total delay information may then be added to the electronic program guide data for communication to programming processing components 105.

Additionally, in certain embodiments, the guide application 166 may evaluate delay information to identify any number of overlapping portions or periods between various items of content. The guide application 166 may also determine whether the content associated with any of the overlapping portions has been included in other components of the broadband communications signal (e.g., included as a carrier signal in the event that bandwidth is available for a channel, included in a designated overlap portion channel, etc.). If the guide application 166 determines that the content is included in another component of the broadband communications signal, then the guide application 166 may include an identifier of the inclusion, a pointer or marker for the overlap information, and/or a link to the overlap information in the electronic program guide data. In this regard, a programming processing component 105 may identify a location of the overlap information.

A wide variety of suitable operations may be performed by the guide application 166 as desired in various embodiments of the invention. The operations described above are provided by way of example only. Another example of the operations that may be performed by the guide application 166 is described in greater detail below with reference to FIG. 2.

According to an aspect of the invention, the service provider system 110 may include or be associated with any number of content servers 125 that facilitate network recording of content, such as network recording of overlapping content and/or content that is cut off by one or more programming processing components 105. In this regard, content that is cut off by a programming processing component 105 may be downloaded by the programming processing component 105 from a content server 125. As desired, a content server 125 may include any number of suitable processor-driven devices configured to record overlapping portions of content and/or cut off content and to provide recorded content to one or more programming processing components 105. Examples of suitable processor-driven devices that may be associated with or utilized as a content server 125 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the content server 125 may form a special purpose computer or other particular machine that is operable to facilitate recording content and/or the providing the recorded content to any number of programming processing components 105.

As desired, a content server 125 may include components that are similar to those described above for the encoder 115. For example, the content server 125 may include any number of processors, memory devices, I/O interfaces, and/or network interfaces. The memory devices may store data files, recorded content 172 (e.g., recorded overlapping content, recorded cut off portions of content, information associated with programming processing components 105 that requested recordings, etc.) and/or software modules utilized by the processors to facilitate the functionality of the content server 125. For example, any number of host modules 168 and/or a recording application 170 may be accessed from memory and executed by the processors to facilitate recording content and providing recorded content to programming processing components 105.

The one or more host modules 168 may be suitable software modules that facilitate the establishment of a communications session with one or more programming processing components 105. In this regard, the content server 125 may receive one or more requests for recording content (e.g., cut off portions of content, etc.). For example, recording requests may be received over a service provider network 130 (e.g., a cable network, a satellite network, etc.) from a programming processing component 105 via a communications session established by a host module 168. A host module 168 may similarly facilitate the establishment of a communications session to download content to a programming processing component 105.

The recording application 170 may be a suitable software module or software application that facilitates the processing of recording requests, the recording of content, and the distribution of recorded content to one or more programming processing components 105. In operation, the recording application 170 may receive a request to record content, such as cut off portions of content recorded by a programming processing component 105, and the recording application 170 may determine whether resources are available to perform a network recording of the content. If it is determined that network resources are not available, then an appropriate error message may be generated and returned to a requesting device. If, however, it is determined that network resources are available to record the content, then the content may be scheduled for recording by the recording application 170. For example, an identifier of the content and/or a recording time for recording the content may be added to a recording queue. In certain embodiments, a determination may be made as to whether another user has requested recording of the content. If it is determined that multiple users have requested that content be recorded, then a single entry in a recording queue may be associated with each of the users. In this regard, duplicate recordings may be avoided.

Once a recording time (e.g., broadcast time, airing time, etc.) for recording the content has been reached, the recording application 170 may direct the storage of the content in one or more suitable memory devices. Additionally, the recording application 170 may generate an identifier (e.g., a memory location identifier, a bookmark, a pointer, etc.) and/or access credentials that may be utilized by one or more programming processing components 105 to download or obtain the content. The recording application 170 may communicate the identifier and/or access credentials to any number of programming processing components 105 associated with user requests for the content.

The recording application 170 may additionally be configured to process requests received from programming processing components 105 to download recorded content. Based upon the receipt of a request to download recorded content, the recording application 170 may direct the communication of recorded content to a requesting programming processing component 105. Alternatively, the recording application 170 may push the recorded content to a programming processing component 105 without receiving a request to download the recorded content. A wide variety of suitable communication techniques may be utilized to download content to a programming processing component, such as a dynamic download session, a background download session, a real-time or near real-time download session, and/or a faster than real-time download session. Once a download has been completed, the recording application 170 may determine whether the recorded content should continue to be stored by the recording application 170. For example, the recording application 170 may determine whether the recorded content should be maintained for one or more other users. In the event that the recording application 170 determines that the content should no longer be stored, the recording application 170 may direct the deletion of the recorded content.

A wide variety of suitable operations may be performed by the recording application 170 as desired in various embodiments of the invention. The operations described above are provided by way of example only. Another example of the operations that may be performed by the recording application 170 is described in greater detail below with reference to FIG. 2.

Communications between various components of the system 100 may be facilitated via any number of suitable networks 130, such as one or more service provider networks (e.g., a cable network, a satellite network, etc.) and/or other networks. The networks 130 may include any telecommunication and/or data networks, whether public, private, or a combination thereof, including but not limited to, a cable network, a satellite network, and/or other service provider networks.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2:
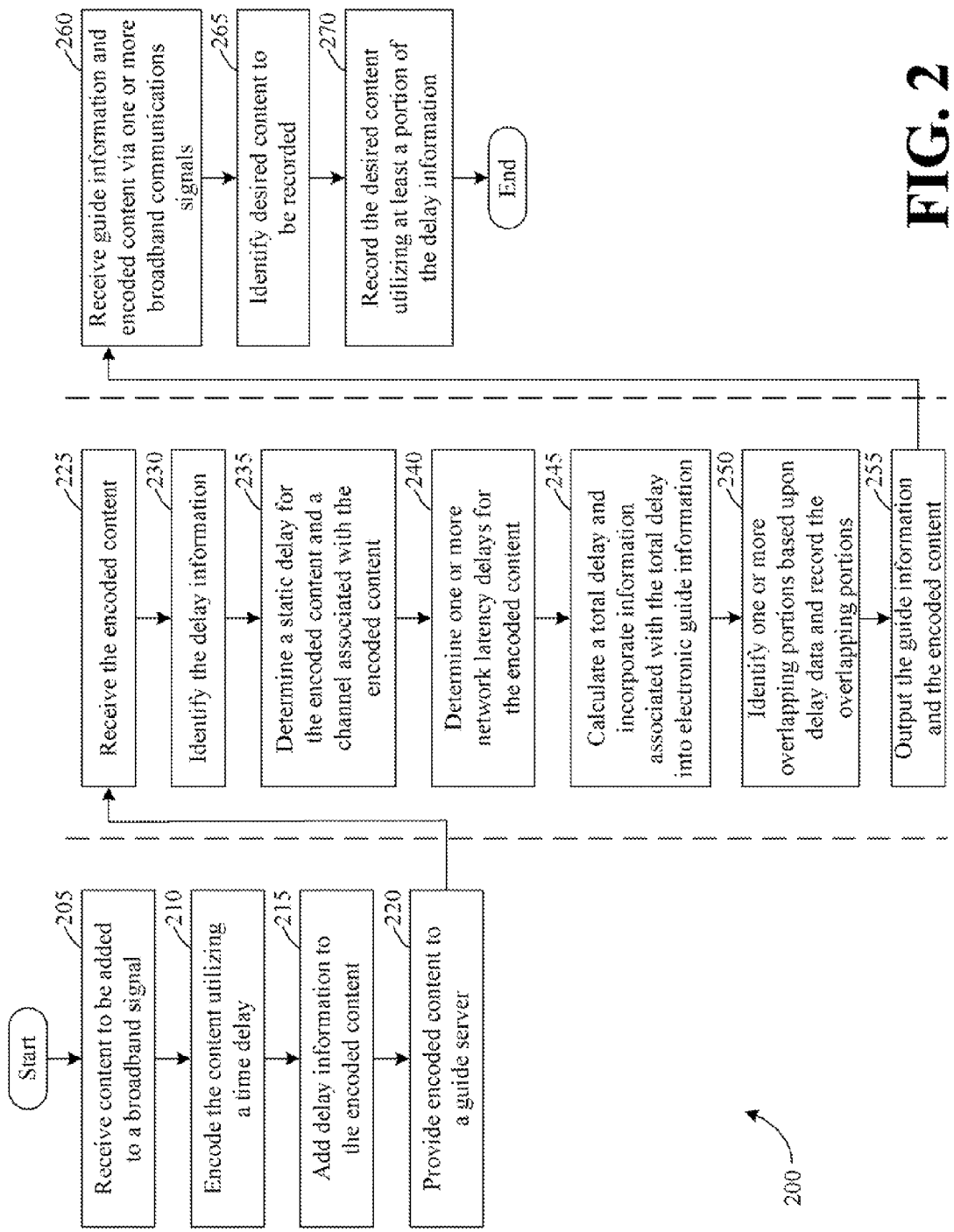
FIG. 2 illustrates a flow diagram of an example method that may facilitate recording of time delayed broadband content, according to an illustrative embodiment of the invention.

FIG. 2 illustrates a flow diagram of an example method 200 that may facilitate recording of time delayed broadband content, according to an illustrative embodiment of the invention. In certain embodiments, the method 200 may be performed by a suitable service provider system and/or programming processing component, such as the service provider system 110 and/or programming processing component 105 illustrated in FIG. 1. The method 200 may begin at block 205.

At block 205, content to be added to a broadband communications signal may be received and/or generated. For example, content may be received by a service provider system 110 and/or one or more encoders, such as the encoders 115 illustrated in FIG. 1, from any number of content providers (e.g., television content providers, etc.). As another example, content may be generated by the service provider. At block 210, the content may be encoded, compressed, and/or otherwise processed by the encoders 115. As a result, the content may be formatted for inclusion in a broadband communications signal. According to an aspect of the invention, time delays may be selectively added to the encoded content. For example, an encoder may improve or enhance the quality of encoded content at the expense of adding a time delay to the encoded content. A wide variety of different amounts of delay may be added to encoded content as desired in various embodiments of the invention. Additionally, as described in greater detail above with reference to FIG. 1, a wide variety of parameters may be evaluated by an encoder 115 during the encoding of content.

At block 215, information associated with added delays may be incorporated into the encoded content. For example, delay information may be embedded into the encoded content. In this regard, other devices, such as a guide data server or a programming processing component, may determine an amount of delay added to content. A wide variety of delay information may be added to the encoded content as desired in various embodiments, such as a delay identifier and information associated with an amount of added delay. As an alternative to or in addition to incorporating delay information into the encoded content, delay information may be communicated by an encoder 115 to one or more other devices (e.g., a guide data server, etc.). At block 220, the encoded content and the delay information may be provided to a guide data server, such as the guide data server 120 illustrated in FIG. 1. Alternatively, the encoded content may be added to a broadband communications signal that may be selectively analyzed and/or processed by the guide data server 120.

At block 225, the encoded content may be received and/or identified by a guide data server 120. For example, a guide data server 120 may receive encoded content from an encoder 115. As another example, a guide data server 120 may receive a broadband communications signal, and the guide data server 120 may identify encoded content included in the broadband communications signal. At block 230, delay information associated with the encoded content may be identified. In certain embodiments, delay information incorporated into the encoded content may be identified. In other embodiments, delay information received from an encoder 115 may be accessed and/or identified. A wide variety of delay information may be identified as desired in various embodiments of the invention, such as information associated with an amount of static delay that has been added to the encoded content. At block 235, an amount of static delay for the encoded content may be determined based at least in part upon an analysis of the identified delay information. Additionally, a channel associated with the encoded content may be determined or identified. For example, a channel to which the encoded content will be mapped may be determined.

At block 240, which may be optional in certain embodiments of the invention, one or more latency delays or network topology delays may be calculated or determined. For example, latency delays associated with the communication of a broadband communications signal to various programming processing components and/or groups of programming processing components may be calculated. At block 245, one or more total delays for encoded content may be calculated, and information associated with the delay may be incorporated into or added to electronic program guide information generated by the guide data server 120. For example, delay information may be associated with a channel for the encoded content, and the delay information may be added to the electronic program guide data for the channel.

At block 250, one or more head end servers, such as the content servers 125 illustrated in FIG. 1, may utilize the electronic program guide data to identify delays associated with various signals and/or channels. The content servers 125 may additionally identify one or more programs that may be impacted at the consumer end (e.g., at the programming processing components) by the added delays. Based upon the identified delays and/or the identified potential overlaps between programs, the content servers 125 may record and/or schedule recordings of one or more overlapping portions for subsequent distribution to consumer devices. As one example, the content servers 125 may identify a maximum delay within the system, and the content servers 125 may record a respective time period for a plurality of data streams and/or channels corresponding to the maximum delay. For example, content may be recorded at the beginning and at the end of the various programs output by the service provider systems 110.

At block 255, the encoded content and the electronic program guide data may be output by the service provider system 110 for communication to any number of programming processing components via a service provider network, such as the network 130 illustrated in FIG. 1. As desired, the encoded content and the electronic program guide data may be incorporated into one or more broadband communications signals output by the service provider system 110. A programming processing component may utilize an EPG application to identify amounts of delay associated with the encoded content. In this regard, the delays may be taken into consideration during the scheduling of recording events.

With continued reference to FIG. 2, a programming processing component 105 may receive the electronic program guide data at block 260. In certain embodiments, the programming processing component 105 may additionally receive one or more broadband communications signals including a wide variety of encoded content. At block 265, desired content to be recorded may be identified by the programming processing component 105. The content may then be scheduled for recording and/or recorded at block 270. In certain embodiments, at least a portion of the delay information associated with the encoded content may be utilized during the scheduling of and recording of the content. For example, delay information may be utilized to identify recording times for content. As another example, delay information may be utilized to identify overlapping portions of content and/or to resolve any timing conflicts between content that is recorded. Additionally, in certain embodiments, the programming processing component 105 may download cutoff portions of content from the one or more content servers 125. One example of the operations that may be performed at blocks 265 and 270 is described in greater detail below with reference to FIG. 3.

The method 200 may end following block 270.

Figure 3:
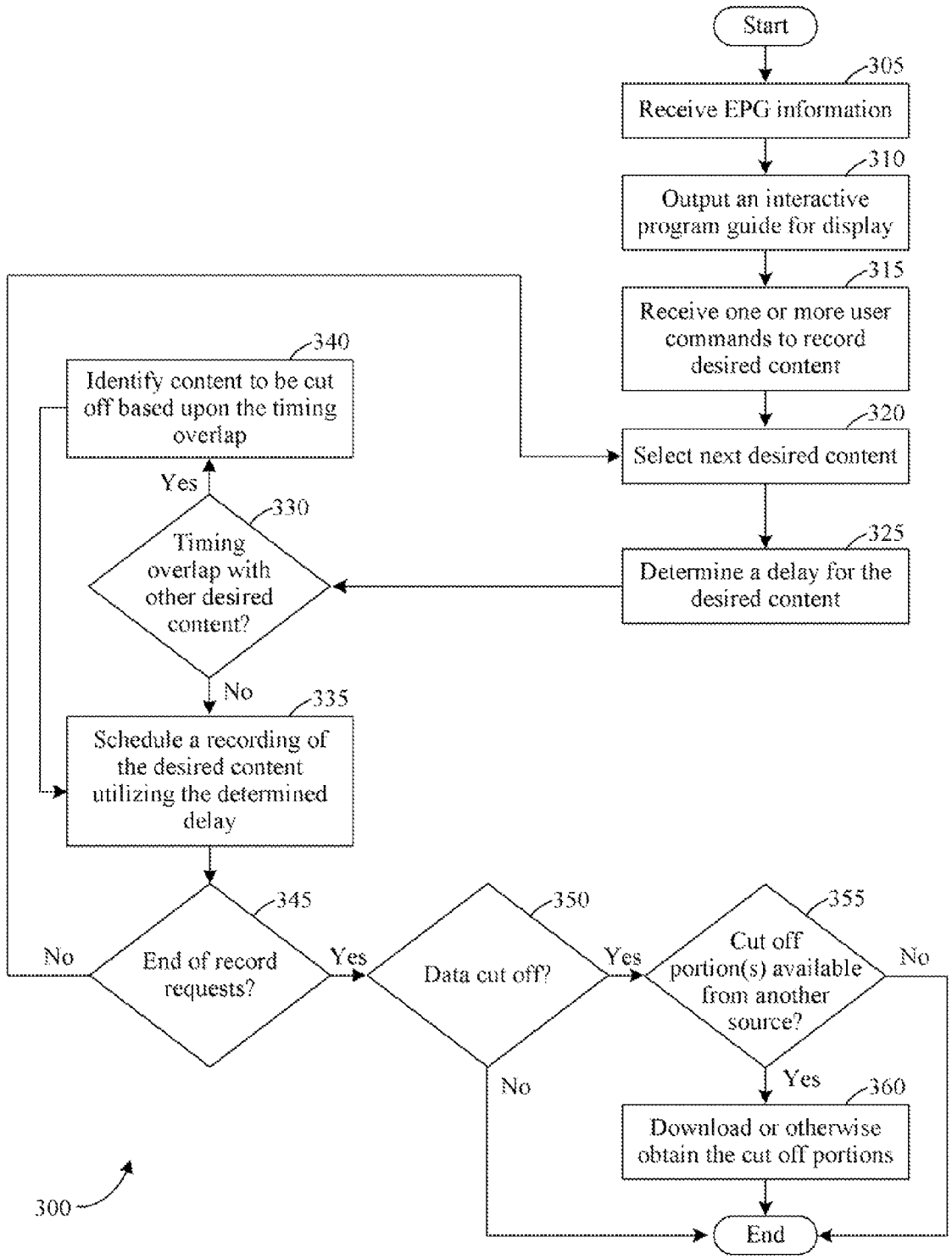
FIG. 3 is a flow diagram of an example method for scheduling and recording desired content at a programming processing component, according to an example embodiment of the invention.

FIG. 3 is a flow diagram of an example method 300 for scheduling and recording desired content at a programming processing component, according to an example embodiment of the invention. In certain embodiments, the method 300 may be performed by a suitable programming processing component and/or recording application, such as the programming processing component 105 and/or recording application 148 illustrated in FIG. 1. The method 300 may begin at block 305.

At block 305, program guide information, such as electronic or interactive program guide information, may be received by a programming processing component 105. For example, EPG information may be included in a broadband communications signal received by the programming processing component 105. At block 310, at least a portion of the received EPG information may be utilized to generate an EPG display, such as an EPG grid, and the EPG display may be output for presentation or display to a user of the programming processing component 105. In certain embodiments, the EPG display may be output in response to a received user request for the EPG display. Once the EPG display has been output, a user may navigate through the EPG display, and the user may select desired content to be recorded. In this regard, one or more user commands to record desired content may be communicated to the programming processing component 105, and the user command(s) may be received at block 315.

At block 320, the next desired content to be recorded may be selected. For example, a recording application 148 may evaluate one or more received user recording requests, and the recording application 148 may select the next desired content for recording. At block 325, an amount of delay (if any) associated with the selected desired content may be determined. For example, delay information included in the EPG data for the content may be identified and evaluated in order to determine an amount of delay associated with the selected content. As another example, delay information included in the broadband communications signal for the content may be identified and evaluated in order to determine an amount of delay associated with the selected content. In this regard, recording times (e.g., a start time, an end time, etc.) associated with the selected content may be determined.

At block 330, a determination may be made as to whether a timing overlap exists between the desired content and other desired content identified for recording or scheduled for recording. For example, recording times for the selected content may be compared to recording times for other content to be recorded. In the event that recording times for different content overlap, a timing overlap may be identified. If it is determined at block 330 that no timing overlap exists, then operations may continue at block 335, and recording of the selected content may be scheduled. In accordance with an embodiment of the invention, a determined amount of delay for the selected content may be utilized in scheduling a recording. For example, the delay may be utilized to schedule a starting time and an ending time for the recording. Operations may then continue at block 345 described in greater detail below.

If, however, it is determined at block 330 that a timing overlap exists between the selected content and other content to be recorded, then operations may continue at block 340. At block 340, a conflict associated with the timing overlap may be resolved by the recording application 148. For example, content to be cut off based upon the timing overlap may be identified or determined. A wide variety of cut off determinations may be made as desired in various embodiments of the invention. For example, if the end of a first item of desired content overlaps with the beginning of a second item of desired content, the end of the first content, the beginning of the second content, and/or portions of both the first content and the second content may be identified as content to be cut off during the recording. In this regard, timing conflicts may be resolved during the scheduling and recording of the selected content. Operations may then continue at block 335 described above, and a recording of the selected content may be scheduled utilizing the delay for the desired content and/or any cut off determinations.

At block 345, a determination may be made as to whether the end of the user requests to record content has been reached. In other words, a determination may be made as to whether any additional recording requests are available for scheduling. If it is determined at block 345 that the end of the recording requests has not been reached, then operations may continue at block 320 described above, and the next desired content for recording may be selected for processing. If, however, it is determined at block 345 that the end of the recording requests has been reached, then operations may continue at block 350.

At block 350, scheduled recordings may be processed and one or more items of desired content may be recorded. Additionally, a determination may be made as to whether any data or content has been cut off during the recording. In other words, a determination may be made as to whether any timing conflicts have been resolved by cutting off data and/or portions of content. If it is determined at block 350 that no content has been cut off, then operations may end. If, however, it is determined at block 350 that content or data has been cut off, then operations may continue at block 355.

At block 355, a determination may be made as to whether one or more cut off portions of content are available from one or more other sources. For example, a determination may be made as to whether a cut off portion of content is available as another component of the broadband communications signal. As another example, a determination may be made as to whether the cut off portion of content may be requested and/or downloaded from a content server, such as the content server 125 described above with reference to FIG. 1. If it is determined at block 355 that the cut off portion of content is not available, then operations may end. If, however, it is determined at block 355 that the cut off portion of content is available, then operations may continue at block 360. At block 360, the cut off portion of the content may be downloaded or otherwise obtained in order to complete a recording of desired content. For example, the cut off portion of the content may be obtained from another component of the broadband communications signal. As another example, the cut off portion of the content may be downloaded from a content server 125. As desired, a request to download the cut off portion may be communicated to the content server 125, and the cut off portion may be communicated to the programming processing component 105 in response to the request. Operations may then end.

The method 300 may end following either of blocks 350, 355, or 360.

The operations described and shown in the methods 200 and 300 of FIGS. 2-3 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-3 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A programming processing component comprising:
    at least one communications interface configured to receive broadband content output by a service provider;
    at least one processor configured to:
        identify desired content to be recorded, the desired content comprising content included in the received broadband content;
        determine a channel associated with the desired content;
        identify, for the channel, delay information included in the received broadband content;
        determine a static delay inserted by an encoder to improve signal quality of the desired content, wherein the static delay is based at least in part on an analysis of the delay information;
        determine a latency delay, wherein the latency delay is associated with a broadband network that facilitates communication of the broadband content from the service provider to the programming processing component;
        determine an amount of delay associated with the channel, wherein the amount of delay is based on the static delay and the latency delay;
        schedule, based at least in part upon the determined amount of delay, the recording of the desired content.

2. The programming processing component of claim 1, wherein the delay information comprises information added to the broadband content by a program guide server, and
    wherein the at least one processor is further configured to utilize an electronic program guide application to identify the delay information.

3. The programming processing component of claim 1, wherein the desired content comprises first desired content associated with a first channel, and
    wherein the at least one processor is further configured to (i) identify second desired content to be recorded, (ii) determine an amount of delay associated with a second channel for the second desired content, (iii) identify a timing overlap between the first desired content and the second desired content, and (iv) resolve a determined timing conflict during the recording of the first desired content and the second desired content.

4. The programming processing component of claim 3, wherein the at least one processor is further configured to resolve the determined timing conflict by identifying a priority for a portion of the desired content, wherein the priority identifies a recorded portion and an unrecorded portion of the desired content, the identified priority comprising one of (i) record a portion of the first desired content, (ii) record a portion of the second desired content, or (iii) record a portion of the first desired content and a portion of the second desired content.

5. The programming processing component of claim 4, wherein the at least one processor is further configured to:
    identify additional data included in the received broadband content, the additional data comprising the unrecorded portion; and
    direct, based at least in part upon the identification of the additional data, recording of the unrecorded portion.

6. The programming processing component of claim 4, wherein the at least one processor is further configured to:
    download the unrecorded portion from a central server associated with the service provider.

7. The programming processing component of claim 1, further comprising:
   at least one user interface configured to receive a user command to record the desired content included in the received broadband content.

8. A method comprising:
   identifying, by a programming processing component configured to receive broadband content output by a service provider, desired content to be recorded;
   determining, by the programming processing component, a channel associated with the desired content;
   identifying, by the programming processing component, for the determined channel, delay information included in the received broadband content;
   determining, by the programming processing component, a static delay inserted by an encoder to improve signal quality of the desired content, wherein the static delay is based at least in part on an analysis of the delay information;
   determining, by the programming processing component, a latency delay, wherein the latency delay is associated with a broadband network that facilitates communication of the broadband content from a service provider to the programming processing component;
   determining, by the programming processing component, an amount of delay associated with the channel based at least in part on the static delay and the latency delay; and
   scheduling, by the programming processing component based at least in part upon the determined amount of delay, the recording of the desired content.

9. The method of claim 8, wherein identifying delay information comprises identifying delay information included in an electronic program guide.

10. The method of claim 8, wherein identifying desired content comprises identifying first desired content associated with a first channel, and further comprising:
    identifying, by the programming processing component, second desired content to be recorded;
    determining, by the programming processing component, an amount of delay associated with a second channel for the second desired content;
    identifying, by the programming processing component, a timing overlap between the first desired content and the second desired content; and
    resolving, by the programming processing component based at least in part upon the identified timing overlap, a timing conflict during the recording of the first desired content and the second desired content.

11. The method of claim 10, wherein resolving a timing conflict comprises resolving a timing conflict by cutting off a portion of the desired content that is recorded, the cut off portion comprising one of (i) a portion of the first desired content, (ii) a portion of the second desired content, or (iii) a portion of the first desired content and a portion of the second desired content.

12. The method of claim 11, further comprising:
    identifying, by the programming processing component, additional data included in the received broadband content, the additional data comprising the cut off portion; and
    directing, by the programming processing component based at least in part upon the identification of the additional data, recording of the cut off portion.

13. The method of claim 11, further comprising:
    downloading, by the programming processing component from a central server associated with the service provider, the cut off portion.

14. A system comprising:
    at least one encoder device configured to encode at least a portion of a broadband communications signal, wherein a delay is inserted into the encoded content in order to improve the quality of the encoded content, and information associated with the inserted delay is inserted into the encoded content;
    at least one guide data server configured to:
       determine a static delay based at least in part on the inserted information;
       determine a latency delay, wherein the latency delay is associated with a broadband network that facilitates communication of the encoded content from the service provider to a programming processing component;
       determine an amount of delay associated with the encoded content, wherein the amount of delay is based on the static delay and the latency delay; and
       incorporate information associated with the determined amount of delay into electronic program guide data; and
    at least one communications interface configured to output the broadband communications signal and the electronic program guide data for communication to the programming processing component via the broadband network,
    wherein the programming processing component is configured to utilize the information associated with the determined amount of delay to schedule a recording of at least a portion of the encoded content.

15. The system of claim 14, wherein the amount of delay is determined for a channel associated with the encoded content.

16. The system of claim 14, further comprising:
    at least one recording server configured to (i) record at least a portion of the encoded content, (ii) receive, from the programming processing component based at least in part upon an identification by the programming processing component of a timing conflict between the encoded content and other content, a request for the recorded content, and (iii) direct, in response to the received request, communication of the recorded content to the programming processing component.

* * * * *